Aug. 28, 1934. W. P. THOMAS Re. 19,296

BOILER CLEANER

Original Filed July 2, 1923 2 Sheets-Sheet 1

Inventor.
Willis P. Thomas
By Charles B. Belknap
Atty.

Aug. 28, 1934. W. P. THOMAS Re. 19,296

BOILER CLEANER

Original Filed July 2, 1923 2 Sheets-Sheet 2

Inventor.
Willis P. Thomas
By Charles B. Belknap
Atty.

Reissued Aug. 28, 1934 Re. 19,296

UNITED STATES PATENT OFFICE 19,296

BOILER CLEANER

Willis P. Thomas, Detroit, Mich., assignor to Diamond Power Specialty Corporation, Detroit, Mich., a corporation of Michigan Original No. 1,840,545, dated January 12, 1932, Serial No. 471,833, July 30, 1930, which is a division of application July 2, 1923, Serial No. 649,140. Application for reissue October 3, 1932, Serial No. 636,083

38 Claims. (Cl. 122—392)

This invention relates to boiler cleaners and has particular reference to a boiler cleaner of the character in which a blower element is adapted to discharge cleaning fluid adjacent portions of the boiler to be cleaned.

The invention relates also to a device for loosening slag deposits from the parts of boilers.

One of the primary objects of this invention is to provide a blower element which may be utilized in the hottest parts of the boiler without being burned up and to thus provide a blower element which will not require frequent renewal.

The invention contemplates in particular the provision of a blower element and means associated with this blower element for cooling the same.

A further object of the invention is to provide means for effecting a sudden cooling and contraction of slag deposits upon the tubes or other parts of a boiler, this contraction having the effect of loosening the slag completely from the boiler parts or effecting a sufficient loosening to permit a subsequent ready removal thereof.

This application is a division of my copending application Serial No. 649,140, filed July 2, 1923.

Other objects and advantages of this invention will become more apparent as the following description proceeds, particularly when reference is had to the accompanying drawings, wherein.

Figure 1:
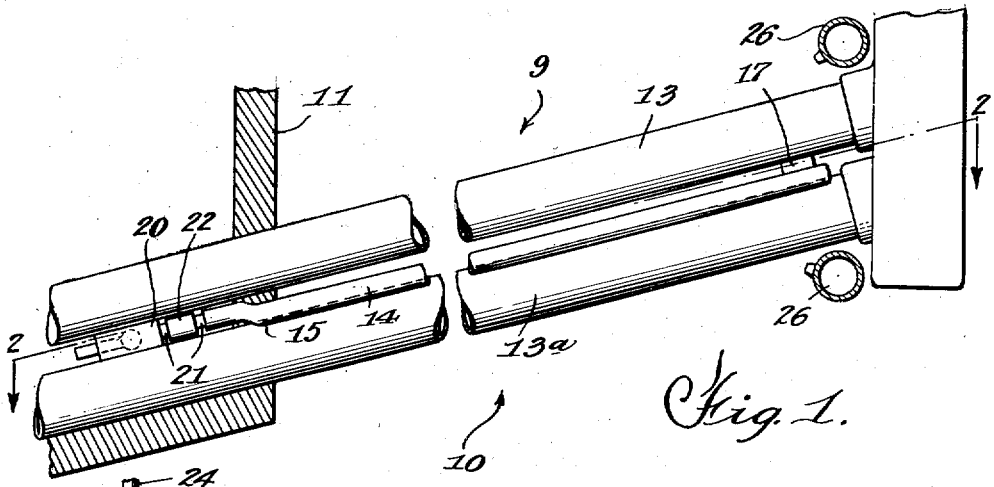
Figure 1 is a side elevational view of a boiler showing a boiler cleaner constructed in accordance with the teachings of this invention associated with the same.
Figure 2:
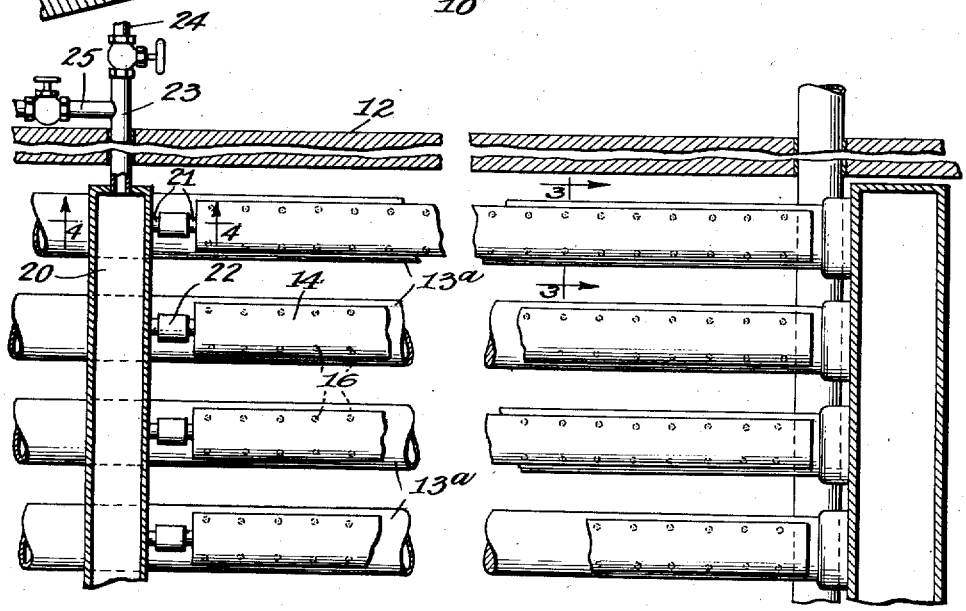
Figure 2 is a sectional view taken substantially on the line 2—2 of Figure 1.

Referring then particularly to the drawings wherein like reference characters designate corresponding parts throughout all views, the numeral 9 designates a boiler having the fire box 10, baffle 11 and the wall 12. The boiler may be of any desired construction, the present invention being more particularly directed to a construction for cleaning parts of the boiler such, for example, as the boiler tubes 13.

Figure 3:
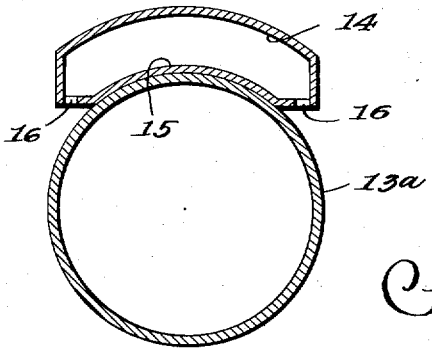
Figure 3 is a sectional view taken substantially on the line 3—3 of Figure 2.
Figure 4:
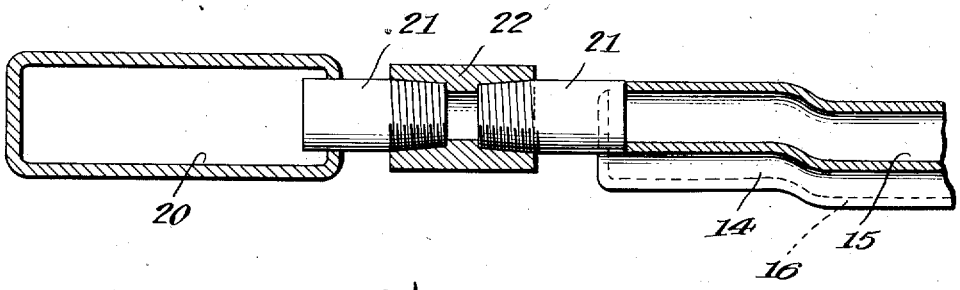
Figure 4 is a sectional view taken substantially on the line 4—4 of Figure 2.

Mounted on certain of the boiler tubes such, for example, as those designated by the reference character 13ª, are flattened pipes 14 which constitute blower elements. As clearly illustrated in Figure 3 of the drawings, each blower element preferably comprises a tubular member having a lower wall 15 which is shaped to conform to the curvature of and which seats on one of the boiler tubes 13ª. Thus one side of the fluid passage formed by the blower element is defined by a side of the boiler tube with which the blower element is associated, the blower element seating on the tube and embracing a portion of the same.

Each pipe 14 may be of a width to project laterally somewhat beyond the portion of the boiler tube with which it is associated and a row of discharge openings 16 is formed in each of these projecting portions. Thus cleaning fluid or the like supplied to the blower element will be discharged adjacent the boiler tube or boiler part with which the blower element is associated and will thus effect a cleaning of the same.

For securing each pipe 14 firmly in contact with its corresponding boiler tube 13ª wedges 17 are preferably inserted between the pipes 14 and the overlying boiler tubes 13.

The pipes 14 are supplied with cleaning fluids from a header 20 which has connections to corresponding ends of the pipes, each of said connections comprising aligned nipples 21 fixed respectively to the header and to the respective pipe and connected by a coupling 22. For supplying fluids to the header 20 there may be provided a supply pipe 23 which passes through the boiler wall and which is connected to the valve controlled supply pipes 24 and 25 respectively. One of these latter supply pipes may be connected to a source of water or like liquid supply while the other supply pipe may be connected to a source of cleaning fluid such as steam, so that either steam or water may be supplied to the blower elements at the will of the operator. If desired, additional blower elements 26 may be provided for discharging additional jets of cleaning fluid adjacent the boiler tubes and other parts of the boiler to be cleaned. Because of the relative close proximity of the tubes 13ª to the flames and hot gases in the fire box 10, accumulation of slag upon these tubes is relatively rapid. This accumulation, unless removed at proper intervals, will, within a comparatively short period of time, completely block the space between adjacent tubes of the row, interfering with circulation of the gases and subjecting the tubes to a continuous high temperature which is detrimental.

Under the teachings of this invention, fluid such as water discharging from the pipes 14 is adapted to flow down the sides of tubes 13ª to the under surfaces of these tubes, exercising a cooling effect upon any slag deposits that may adhere to these surfaces. Thus, in use, water may be admitted at predetermined intervals to the header 20 by way of pipe 24, the water flowing from the header 20 to the pipe 14 and discharging from the latter through the openings 16. The sudden cooling and resultant contraction of any slag deposits upon the tubes 13ª resulting from this flow of water loosens these deposits to such an extent that they will either drop from the tubes or may be readily blown from the tubes by a subsequent discharge of steam. This subsequent discharge may be effected either by supplying steam to the pipes 14 after cutting off the water supply thereto or may result from an operation of the blower elements 26.

From the above it will be apparent that the invention provides blower elements which are arranged in juxtaposition to the parts of the boiler to be cleaned. Each blower element is provided with a side defined by a side of the boiler part with which it is associated, and this side of the blower element constitutes a wall which seats on and is thus in thermal contact with the boiler part. Thus heat will be conducted away from the blower elements through the boiler tubes or boiler parts with which the blower elements are associated so that the blower elements may be arranged in the hottest parts of the boiler without danger of their being burned.

It will further be apparent that the invention provides a device by which a cooling fluid such as water may be flowed over the surfaces of the tubes 13ª upon which the slag collects. Thus the slag will be loosened to such an extent that it may be readily removed from the tubes.

For the sake of convenience, the invention has been described as being embodied in a boiler cleaner for cleaning parts of a boiler. It will be readily apparent, however, that the invention may also be embodied in devices for cleaning apparatuses similar to boilers, and it is to be therefore understood that the term "boiler" wherever used in the specification or claims is to be construed as meaning a heat transfer apparatus or fluid heater of any character, while the term "boiler cleaner" is to be construed as meaning a cleaner for any such apparatus.

While one form of the inventive idea has been described with considerable detail, it is to be clearly understood that the description is for the purposes of illustration only and is not definitive of the limits of the inventive idea. The right is reserved to make such changes in the details of construction and arrangement of parts as will fall within the purview of the attached claims.

What I claim as my invention is:

1. In a boiler cleaner, the combination with a relatively cool boiler part, of a blower element having discharge openings arranged to discharge cleaning fluid adjacent parts of the boiler to be cleaned to dislodge deposits therefrom, said blower element being positively secured in contact with said boiler part and having a wall engaging a substantial portion of the same sufficient to provide for cooling of said element by said boiler part.

2. In a boiler cleaner, the combination with a relatively cool boiler part, of a blower element having discharge openings arranged to discharge cleaning fluid adjacent parts of the boiler to be cleaned to dislodge deposits from the same, said blower element being positively secured in contact with said boiler part and having a wall seating on and having sufficient thermal contact with said boiler part to provide for cooling of said blower element by said boiler part.

3. In a boiler cleaner, the combination with a boiler part, of means providing a cleaning fluid passage in juxtaposition to said boiler part, said means being positively secured in contact with said boiler part and having sufficient thermal contact with said boiler part to be cooled thereby and being so constructed and positioned as to discharge cleaning fluid adjacent parts of the boiler to be cleaned to dislodge deposits from the same.

4. In a boiler cleaner, the combination with a boiler part relatively cool as compared to the zone in which it is located, of means providing a cleaning fluid passage partially surrounding and in heat exchange relation with respect to a portion of said boiler part, said means being positively secured in contact with said boiler part and being so constructed and positioned as to discharge cleaning fluid adjacent the parts of the boiler to be cleaned to dislodge deposits from the same.

5. In a boiler cleaner, the combination with a boiler part relatively cool as compared to the zone in which it is located, of means positively secured in contact with said boiler part providing a cleaning fluid passage in heat exchange relation with respect to said boiler part and having side portions in juxtaposition to said boiler part, said boiler part being provided with a portion projecting to a position between the said side portions of said passage.

6. In a boiler cleaner, the combination with a boiler tube relatively cool as compared to the zone in which it is located, of means positively secured in contact with said boiler tube providing a blower element in heat exchange relation with respect to and partially surrounding a portion of said boiler tube, said blower element being so constructed and positioned as to discharge cleaning fluid adjacent parts of the boiler to be cleaned to dislodge deposits from the same.

7. In a boiler cleaner, the combination with a boiler tube, of means providing a blower element in juxtaposition to said boiler tube, and so constructed and positioned as to discharge cleaning fluid adjacent parts of the boiler to be cleaned to dislodge deposits from the same, said blower element having a wall positively secured in sufficient thermal contact with said boiler tube to be cooled thereby.

8. In a boiler cleaner, the combination with a boiler tube, of means providing a blower element extending parallel with said boiler tube, said blower element having discharge openings arranged to discharge cleaning fluid adjacent parts of the boiler to be cleaned to dislodge deposits from the same and having a wall positively secured in sufficient thermal contact with said boiler tube to be cooled thereby.

9. In a boiler cleaner, the combination with a boiler tube, of means providing a blower element adjacent said boiler tube, said blower element having discharge openings arranged to discharge cleaning fluid adjacent parts of the boiler to be cleaned to dislodge deposits from the same and having a wall seating on said boiler tube and positively secured in sufficient thermal contact with the same to be cooled thereby.

10. In a boiler cleaner, the combination with a boiler tube, of means positively secured in contact with said boiler tube providing a blower element parallel with and in heat exchange relation with respect to said boiler tube, said blower element having discharge openings arranged to discharge cleaning fluid adjacent parts of the boiler to be cleaned to dislodge deposits from the same and having a side concentric with said boiler tube and the heat exchange relation being such that heat flows from said blower element to said boiler tube.

11. In a boiler cleaner, the combination with a boiler tube, of means positively secured in contact with said boiler tube providing a blower element fixed parallel with and partially surrounding a portion of said boiler tube, said blower element being provided with discharge openings for directing jets of cleaning fluid adjacent portions of the boiler to be cleaned to dislodge deposits from the same and being arranged in such heat exchange relation with respect to said boiler tube that the blower element is cooled by said boiler tube.

12. In a boiler cleaner, the combination with a boiler tube relatively cool as compared to the zone in which it is located, of means providing a blower element fixed parallel with and partially surrounding a portion of said boiler tube, said blower element having discharge openings arranged to discharge cleaning fluid adjacent parts of the boiler to be cleaned to dislodge deposits from the same and having a wall engaging said boiler tube and positively secured in thermal contact with the same.

13. The combination with a boiler tube located with respect to the combustion chamber so as to be subjected to the accumulation of slag, of a water pipe arranged immediately above said tube and substantially parallel therewith and formed with a row of downward outlets for the discharge of water toward said tube.

14. The combination with a boiler tube located with respect to the combustion chamber so as to be subjected to the accumulation of slag, of a fluid pipe seating upon said tube and provided with rows of outlets opening downwardly adjacent the opposite sides of said pipe for respectively discharging fluid upon the sides of said boiler tube.

15. The combination with a boiler tube, of a flattened fluid pipe seating upon said tube and having a cylindrically concaved underface conforming to the curvature of said boiler tube, said pipe having downward outlets adjacent its side walls and disposed on opposite sides of the boiler tube for discharging respectively upon opposite sides of the boiler tube.

16. The combination with a bank of boiler tubes close adjacent to the furnace, of a fluid conducting pipe associated with each of the tubes of the lower row of said bank, each of said pipes having an orifice arranged to flow a slag removing fluid around its respective tube.

17. The combination with a boiler part, of means providing a blower element adjacent said boiler part, said blower element being provided with discharge openings for directing a fluid from said blower element adjacent said boiler part, means for supplying water to said blower-element and means for supplying steam to said blower element.

18. The combination with a boiler tube located with respect to the combustion chamber so as to be subjected to the accumulation of slag, of means providing a blower element extending from a point outside of said boiler setting, said blower element being positioned parallel to and adjacent to said boiler tube and being provided with discharge openings for directing a fluid adjacent said tube, means for supplying a slag removing fluid to said blower element, and means for supplying a cleaning fluid to said blower element.

19. In a boiler cleaner, the combination with a boiler tube, of means providing a blower element arranged longitudinally of said tube and positively secured in sufficient thermal contact with said tube to be cooled thereby, said blower element being so constructed and positioned as to discharge cleaning fluid adjacent parts of the boiler to be cleaned to dislodge deposits from the same.

20. In a boiler cleaner, the combination with a boiler tube, of means including a wall providing a blower element extending longitudinally of said boiler tube, said wall being positively secured in sufficient thermal contact with said boiler tube throughout substantially its entire length to be cooled thereby, and said blower element being so constructed and positioned as to discharge cleaning fluid adjacent parts of the boiler to be cleaned to dislodge deposits from the same.

21. The combination with a boiler tube, of a cleaner pipe extending adjacent said tube and formed with outlets for a discharge against said tube, and means for selectively admitting water or steam to said pipe.

22. The combination with a boiler part, and a steam blower for cleaning a predetermined portion of said part, of a pipe adjacent said part having outlets for the discharge of a slag removing liquid upon the portion of said part cleaned by said steam blower.

23. The combination with a boiler tube located with respect to the combustion chamber so as to be subjected to the accumulation of slag, of a water pipe arranged above said tube and substantially parallel therewith and formed with a row of downward outlets for the discharge of water upon said tube, said outlets being so positioned and directed that a film of water is caused to cover the boiler tube for removing slag and the like from the boiler tube.

24. The combination with a boiler part located with respect to the combustion chamber so as to be subjected to the accumulation of slag, of a fluid conducting pipe extending from a point outside the boiler setting and having means within the boiler setting for discharging the fluid from the pipe toward the slag accumulation, means for controlling the supply of a cleaning fluid through said pipe, a source of slag removing fluid, and means for controlling the supply of said slag removing fluid through said pipe.

25. The combination with a boiler part located with respect to the combustion chamber so as to be subjected to the accumulation of slag, of means for selectively covering the slag coated portion of said part with a film of water to effect a contraction of the slag and discharging steam into immediate contact with the slag coated portion of said part.

26. In a boiler cleaner for a water tube boiler, means for discharging a cooling fluid upon the outside of a water tube to loosen deposits thereon, and means for dislodging the deposits from said tube while the deposits are loosened, both of said means being operable during operation of the boiler.

27. In a boiler cleaner, the combination with a boiler tube, of means positively secured in contact with and extending a substantial distance longitudinally of the boiler tube providing a cleaning fluid passage parallel with and partially surrounding said boiler tube, the surface of said passage disposed toward said tube being concentric with the tube, and means providing for the discharge of cleaning fluid from said passage adjacent the portions of the boiler to be cleaned to dislodge deposits therefrom.

28. A fluid conducting tube and blower unit for a circulatory system consisting of means providing a pair of adjacent parallel passages positively secured in such heat exchange relation with respect to each other that the one is cooled by the other, one of said passages being a normal circulation element of said boiler and forming at all times a part of said circulatory system, means for supplying a cleaning fluid to the other of said passages, the last mentioned passage being separated from the first mentioned passage by means including a wall concentric with the axis of the first mentioned passage, and means providing for the discharge of cleaning fluid from the second mentioned passage adjacent portions of the boiler to be cleaned to dislodge deposits therefrom.

29. In a boiler cleaner, the combination with a boiler tube, of means associated with, positively secured in contact with and extending a substantial distance longitudinally of said boiler tube providing a cleaning fluid passage adjacent to, exteriorly of and parallel with said boiler tube, one side of said cleaning fluid passage conforming in shape to the shape of the adjacent side of the boiler tube, and means providing for the discharge of cleaning fluid from said cleaning fluid passage adjacent portions of the boiler to be cleaned to dislodge deposits therefrom.

30. A fluid conducting tube and blower unit for a circulatory system consisting of means providing a pair of adjacent parallel passages positively secured in such heat exchange relation with respect to each other that the one is cooled by the other, means providing for the connection of one of said passages to the circulatory system of a boiler, means for supplying cleaning fluid to the other of said passages, the last mentioned passage being disposed exteriorly of the first mentioned passage and the adjacent portions of said passages conforming in shape to each other, and means providing for the discharge of cleaning fluid from the second mentioned passage adjacent portions of the boiler to be cleaned to dislodge deposits therefrom, the heat exchange relation being such that heat flows from the second mentioned passage to the first.

31. A unit including a tubular cleaning member for a soot cleaner and a cooling element therefor comprising walls positively secured in such thermal contact with each other throughout the length of one of the walls that the one is cooled by the other and forming fluid carrying passages, one of which is for a substantial portion of its length at least partially surrounded by the other, there being provided discharge openings through a single wall of said unit placing one of said passages in communication with the medium surrounding the member.

32. A combined tubular cleaning member for a soot cleaner and a cooling means therefor composed of walls positively secured in such thermal contact with each other throughout the length of one of the walls that the one is cooled by the other and forming a pair of adjacent parallel passages, means for supplying a cooling fluid to one of said passages, means for supplying a cleaning fluid to the other of said passages, and means providing for the discharge of cleaning fluid from said last mentioned passage into the medium surrounding the member.

33. A combined tubular cleaning unit for a soot cleaner and a cooling means therefor comprising a relatively cool member, and means providing a cleaning fluid passage in juxtaposition to said member, said means being positively secured in sufficient thermal contact with said relatively cool member to be cooled thereby and being so constructed and positioned as to discharge cleaning fluid adjacent parts to be cleaned to dislodge deposits from the same.

34. A combined tubular cleaning member for a soot cleaner and a cooling means therefor comprising a cooled tube, and means providing a blower element having discharge openings, said blower element having a wall positively secured in sufficient thermal contact with the cooled tube to be cooled thereby.

35. A combined tubular member for a soot cleaning apparatus and a cooling means therefor composed of walls positively secured in sufficient thermal contact with each other along longitudinal lines that the one is cooled by the other and arranged to form a passage for a cooling fluid and a separate passage for a cleaning fluid disposed exteriorly of said cooling fluid passage, and means providing for the discharge of cleaning fluid from said cleaning fluid passage.

36. A tubular cleaning member for a soot cleaner and a cooling means therefor consisting of two pipe sections positively secured in sufficient thermal contact with each other throughout the length of one of said pipe sections that the one is cooled by the other, means providing for the supply of a cooling fluid to one of said pipe sections, and means providing for the supply of a cleaning fluid to the other of said pipe sections, said last mentioned pipe section being provided with openings for discharging the cleaning fluid from the same.

37. In a fluid heater cleaner and a cooling means therefor, walls positively secured in sufficient conductive heat exchange relation with respect to each other along longitudinal lines that the one is cooled by the other and forming a pair of adjacent parallel passages, means for supplying a cooling fluid to one of said passages, and means for supplying a cleaning fluid to the other of said passages, there being provided discharge openings passing through a single wall to provide for the discharge of cleaning fluid from said last mentioned passage adjacent parts of the fluid heater to be cleaned to dislodge deposits from the same.

38. In combination, a nozzled cleaner tube, a fluid cooled tube, a source of cleaning fluid supply for the cleaner tube, a source of fluid supply for the fluid cooled tube, and means positively securing a wall of said cleaner tube in sufficient thermal contact with a wall of said fluid cooled tube as to be cooled thereby.

WILLIS P. THOMAS.